United States Patent [19]

Aken et al.

[11] Patent Number: 5,839,030
[45] Date of Patent: Nov. 17, 1998

[54] DRUM-TYPE IMAGESETTER WITH VARIABLE DIAMETER

[75] Inventors: Luc Van Aken, Kuringen; Bert Vackier, 's-Gravenwezel; Karel Van den Eynde, Deurne, all of Belgium

[73] Assignee: Agfa-Gevaert N.V., Mortsel, Belgium

[21] Appl. No.: 736,015

[22] Filed: Oct. 22, 1996

Related U.S. Application Data

[60] Provisional application No. 60/009,575 Jan. 3, 1996.

[30] Foreign Application Priority Data

Nov. 13, 1995 [EP] European Pat. Off. ............ 95203078.1

[51] Int. Cl.⁶ ...................................................... H04N 1/08
[52] U.S. Cl. .......................... 399/117; 271/276; 347/262; 355/72
[58] Field of Search ..................................... 399/161, 159, 399/117, 166; 355/72, 47, 117; 346/138; 271/275–277, 314; 347/139, 262, 264

[56] References Cited

U.S. PATENT DOCUMENTS

| | | | |
|---|---|---|---|
| 4,204,471 | 5/1980 | Becker | 271/277 X |
| 4,575,398 | 3/1986 | Tschishow | 156/99 |
| 5,026,045 | 6/1991 | Wirz et al. | 271/277 |
| 5,317,424 | 5/1994 | Aotani | 358/491 |
| 5,459,505 | 10/1995 | Ballegaard et al. | 347/260 |
| 5,480,138 | 1/1996 | Haupenthal et al. | 271/276 |

FOREIGN PATENT DOCUMENTS

| | | |
|---|---|---|
| 4313111 | 10/1994 | European Pat. Off. . |
| WO9314441 | 7/1993 | WIPO . |

*Primary Examiner*—Arthur T. Grimley
*Assistant Examiner*—Quana Grainger
*Attorney, Agent, or Firm*—Baker & Botts, L.L.P.

[57] ABSTRACT

Drum-type imagesetter for producing an image on a flexible sheet of radiation-sensitive material, which comprises retaining bars (62) for retaining a sheet in a substantially cylindrical configuration, and an exposure system (70) for image-wise exposing the curved sheet, the radial position of the sheet retaining bars (62) being controlled by adjustment screws (49, 50) allowing different drum diameters to be set.

24 Claims, 6 Drawing Sheets

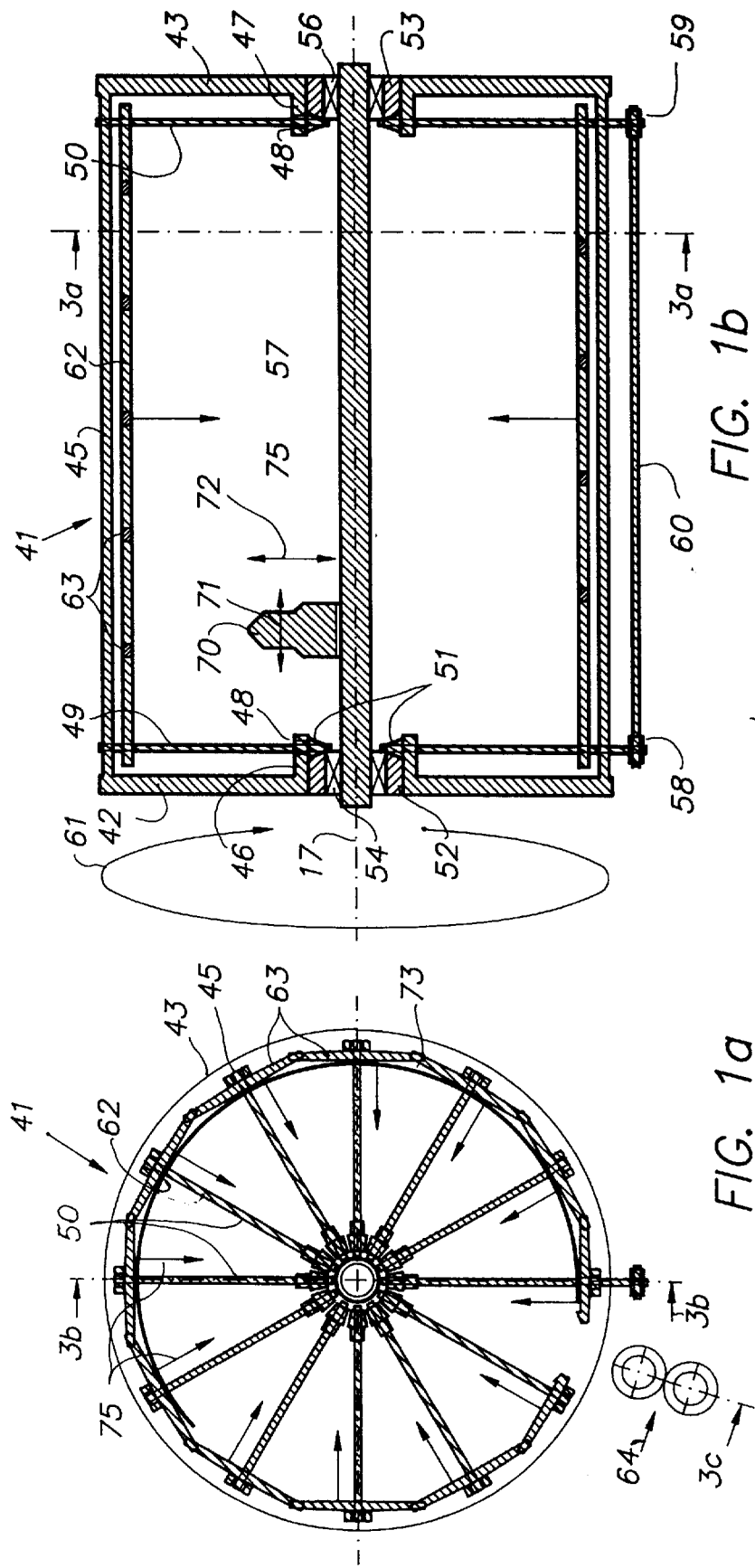
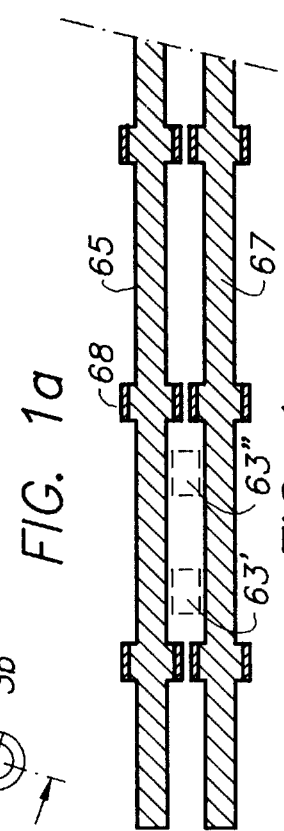
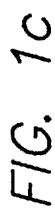
FIG. 1a
FIG. 1b
FIG. 1c

DRUM-TYPE IMAGESETTER WITH VARIABLE DIAMETER This application claims the benefit of U.S. provisional application Ser. No. 60/009,575, filed Jan. 3, 1996.

BACKGROUND OF THE INVENTION

1. Field of the Invention

The present invention relates to a drum-type imagesetter for producing an image on a flexible sheet of radiation-sensitive material.

2. Description of the Prior Art

The art of drum-type imagesetters comprises two types of apparatus.

First, the so-called internal drum recorders in which a flexible light-sensitive sheet is held against the inside surface of a stationary drum and is line-wise exposed by means of a rotating prism which deflects an axial laser beam at right angles onto the surface of the sheet. The mirror and its driving motor are mounted on a carriage which can travel axially through the drum thereby to cover the exposure width (i.e. the dimension parallel to the drum axis) of the apparatus.

Disadvantages of this type of apparatus are as follows:

- the duty cycle is limited; a typical maximum of exposure period versus revolution period is approximately 70%; moreover, this ratio changes with the film sheet length (i.e. the dimension normal to the drum axis);
- since the laser beam follows the centre line of the internal drum, one has to be careful with the generation of stray light; and
- finally, sheet handling is difficult, in particular for relatively stiff sheets such as aluminium offset plates, and for small drum diameters.

A second class of apparatus are external drum recorders in which a light-sensitive sheet is fitted to the outside surface of a rotating drum, and the exposure occurs by a light source travelling along the outer periphery of the drum. These apparatus show the following disadvantages:

- their rotational speed is limited (typically 2500 rpm) because of the high inertia of the drum, and
- the duty cycle depends on the length of the light-sensitive sheets, in a way comparable with internal drum recorders.

SUMMARY OF THE INVENTION

Objects of the Invention

It is one object of the present invention to provide a light-weight imagesetter which allows the attainment of higher duty cycles than known apparatuses. In the best case, the duty cycle can amount up to 100% if leading and trailing edges of a sheet are in abutting relationship.

A further object of the invention is a rotating drum-type image recorder with a limited inertia so that the rotational speed can be higher than in conventional apparatus (typically up to 2500 rpm).

Still another object of the invention is an imagesetter the loading of which is more convenient than known apparatus. This is important for the loading of relatively stiff materials such as aluminium offset printing plates that can not readily be bent and made to conform to the circumference of the drum upon their loading, especially if the drum diameter is small.

Statement of the Invention

In accordance with the present invention a drum-type imagesetter for producing an image on a flexible sheet of radiation-sensitive material, which comprises

- retaining means for retaining said sheet in a substantially cylindrical configuration, and
- exposure means for image-wise exposing said curved sheet, is characterised thereby that said sheet retaining means comprises adjustment means allowing different drum diameters to be set for obtaining an optimum duty cycle for different sheet formats.

The sheet retaining means can be arranged to offer an almost uninterrupted supporting surface for a sheet, but preferably such supporting means is arranged for entering in supporting contact with local areas only of a sheet, thus forming so to say a virtual drum.

The absence of a rigid and uninterrupted cylindrical surface to back up the sheet to be image-wise exposed notably reduces the mass of the revolving parts of the apparatus, if the drum rotates and the exposure source is stationary. The resulting smaller inertia thus allows higher rotational speeds than usual to be used. Further a relatively light-weight overall construction can result.

According to one aspect of the invention, the sheet retaining means comprises means having radially inward surfaces for entering in physical contact with the outside surface, i.e. the convexly curved side, of the sheet, and are arranged for rotation about the axis of the drum thereby to force said sheet in tight engagement with said inward surfaces under the influence of centrifugal forces.

When film, paper or almost any other flexible sheet material is rolled into a cylindrical shape, the material achieves a greater rigidity and stability than when supported in flat or planar condition. This is the more so for aluminium lithographic printing plates which are still flexible but yet more rigid, i.e. having a greater rigidity than photosensitive film or paper. The cylindrical configuration of these plates is maintained also if the radially inward surfaces of the sheet retaining means are not continuous circular surfaces, but instead distinct surfaces equally angularly spaced thus rather forming a polygon for support of the plates.

The aspect of the invention described hereinbefore relates to internal drum exposure. However, an apparatus according to the invention is suited as well for external exposure and in such case the sheet retaining means will have radially outward surfaces for supporting the inward surface, viz. the concavely curved side of a sheet. In the latter case, additional means will be provided for keeping the sheet in contact with such supporting surfaces during rotation and at standstill of the drum.

The possibility afforded by the imagesetter according to the invention to use different drum diameters is important since it allows the circumference of the drum to match as close as possible the length of the sheet whereby a sheet can be made to cover up to at least 325 angular degrees of the drum corresponding with a duty cycle of 90%. Depending on the construction of the apparatus, a duty cycle theoretically up to 100% can be obtained.

Another interesting aspect of a variable drum diameter is that, in the case of internal drum exposure, the drum can be opened to a relatively large diameter whereby loading and/or unloading of a sheet can be easier. After loading of the sheet the drum diameter is reduced so that a higher duty cycle and a smaller inertia are obtained. This operation is in particular interesting for the loading of relatively stiff sheets such as aluminium offset printing plates which are less easy to manipulate. However, although the accent in the present description is on such plates, it should be understood that an imagesetter according to the present invention is as well suited for use with paper, plastic and other types of flexible supports for use in image-wise exposure.

The aspects described hereinbefore related to an imagesetter with rotating drum and stationary exposure means. It will be understood that the drum may as well be stationary and the exposure means rotating for the same advantages to be obtained, viz. an increased duty cycle and an easier loading.

The means for image-wise exposure of a sheet can be of the active or passive type. With active means we mean LED's (light-emitting diodes), conventional and high power lasers, and the like. With passive means we mean light valves capable of interrupting or modulating radiation from one or a plurality of sources, one or a plurality of small mirrors that can be deflected to control the amount of radiation reflected from a suitable light source onto the sheet, etc.

The term "radiation-sensitive" stands for light- as well as heat-sensitive recording material. A suitable material for heat-mode recording has been disclosed in EP 93 201 858.3.

BRIEF DESCRIPTION OF THE DRAWINGS

The invention will be described hereinafter by way of example with reference to the accompanying drawings, wherein:

FIGS. 1a, 1b and 1c show one embodiment of an adjustable imagesetter according the internal-drum type according to the invention.

DETAILED DESCRIPTION OF THE INVENTION

Figure 2B:
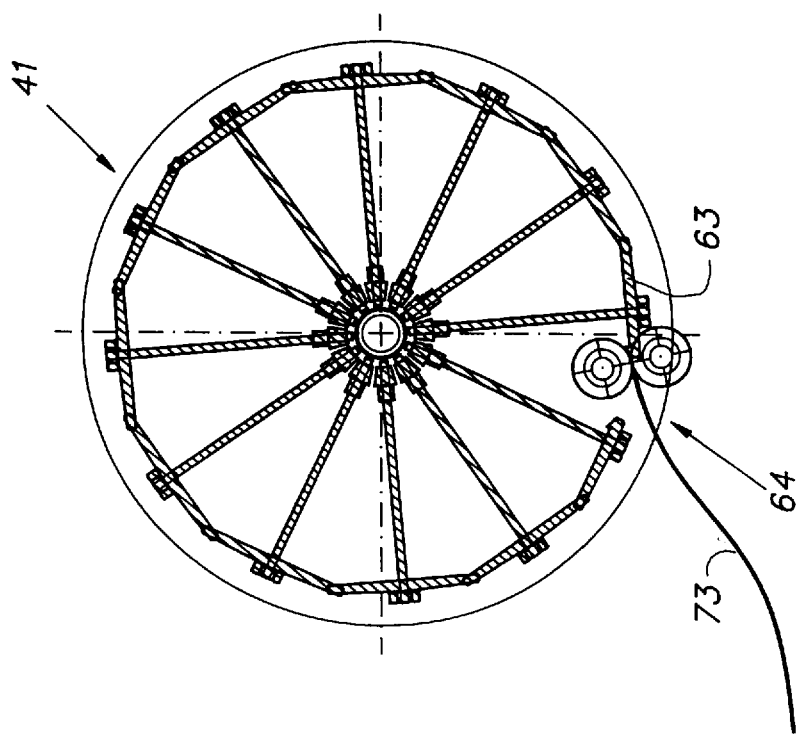
FIGS. 2a to 2f show one embodiment of a method for loading a sheet in an imagesetter according to FIGS. 1a and 1b.

Referring to FIGS. 1a to 1c, there is shown an embodiment of a virtual internal drum imagesetter having an adjustable diameter according to the invention.

Drum 41 is a cage-like construction formed by two axially spaced circular flanges 42, 43 rigidly interconnected by parallel bars 45. The flanges have inside hubs 46, 47 with angularly spaced radial bores 48 forming with corresponding bores in bars 45 slide bearings for the rotational bearing of screw-threaded radial shafts 49, 50. The inside ends of the shafts have conical pinions 51 engaging crown wheels 52, 53 rotatably journalled in corresponding hubs 46, 47. The crown wheels are also rotatably journalled on a stationary shaft 57 by means of roller bearings 54, 56. One shaft of each of series 49, 50 bears a gear wheel 58, 59, a timing belt 60 or the like coupling both gears to each other. Main shaft 57 is supported in the light-tight housing of the apparatus and one of flanges 42, 43 can be provided with a pulley, a gear or the like for coupling the drum to a suitable driving motor so that the drum can be rotated as indicated by arrow 61.

The apparatus comprises a number of sheet-supporting bars 62, twelve in the present example, the ends of which are in screw-threaded engagement with radial shafts 49, 50. Each bar 62 has a number of cross bars in the form of fingers 63 extending at a right angle on both sides thereof, the fingers of adjacent bars 62 being axially shifted, as shown for the upper and lower bars in FIG. 1b, so that they interengage each other. The purpose of the interengaging fingers is to define an uninterrupted peripheral guiding path for a sheet as it is tangentially loaded into the drum. The fingers can be straight as shown, but can also be curved, the radius of curvature of their inside surfaces being larger than that of the largest diameter of the drum.

The apparatus finally comprises a sheet feeding roller pair 64 comprising two rollers 65 and 67, as shown in FIGS. 1b and 1c. FIG. 1c which is a cross-sectional view along line 1c—1c of FIG. 1b. Rollers 65 and 67 have a crenelated profile, the larger diameter sections having a resilient covering 68 for driving engagement with the sheet surface. At one position there have been shown the interengaging fingers 63' and 63" of opposed bars 62. This construction will be further explained with reference to FIGS. 2a to 2f hereinafter.

Finally, the apparatus comprises an exposure head 70 which is mounted for translation on shaft 57 as indicated by arrow 71, and which is provided with focusing means for focusing, see the arrow 72, its radiation beam onto a sheet in the drum.

Exposure head 70 is moved by suitable driving means, and its electrical connections can be passed through shaft 57 for outside connection. The head can comprise a single radiation source or an elongated array of adjacent sources running parallel to the drum. In operation of the imagesetter, a sheet 73 within the drum, see FIG. 1a, is helically exposed as the drum rotates and the exposure head axially moves from one end to the other of the drum.

Rotation of the drum causes the sheet to be firmly applied against supporting fingers 63 by centrifugal forces and/or by stops engaging its leading and trailing edge, and as a consequence of its increased stiffness in a direction parallel to the drum axis, aluminium plate 73 assumes a cylindrical shape.

The duty cycle of the illustrated example is limited since, as shown, the sheet occupies approximately 225 angular degrees only of the drum. However, this imagesetter has a variable diameter, and by appropriate rotation of belt 60, e.g. through a small electric motor with reduction gear, radial shafts 49, 50 are rotated synchronously whereby bars 62 can be approached towards each other, as shown by arrows 75 in FIG. 1a. In that way a situation can be obtained in which the sheet covers at least 350 angular degrees of the drum.

A suitable method of loading of the apparatus is now described in detail with reference to FIGS. 2a to 2f.

Figure 2A:
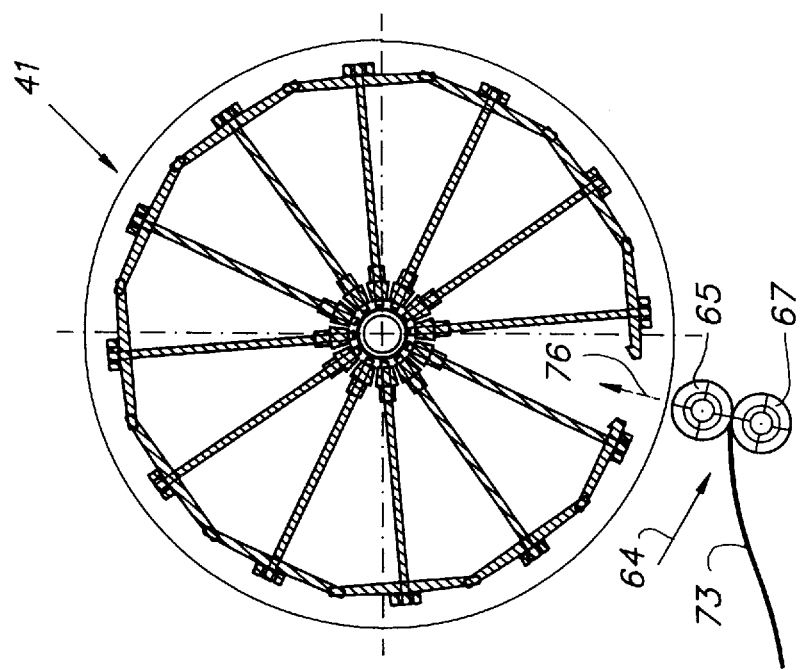
Figure 2D:
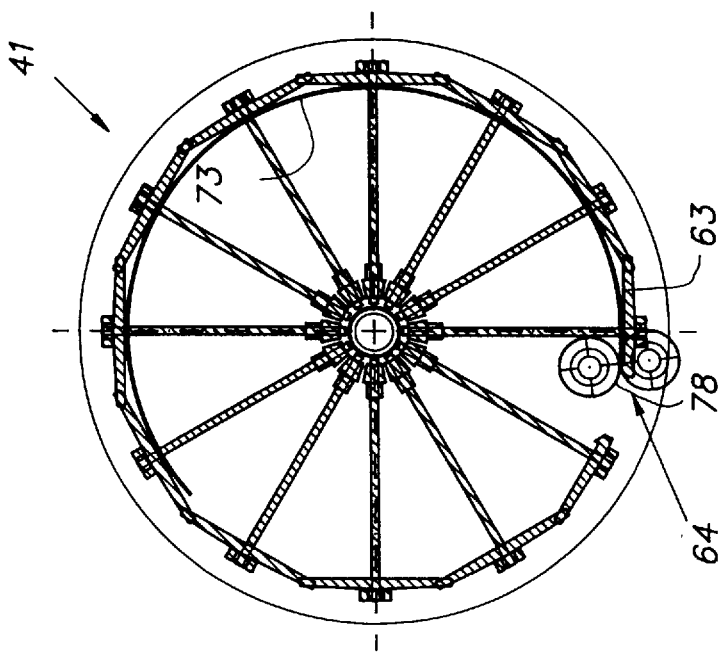

Drum 41 being in an angular position as shown in FIG. 2a, feed roller pair 64 is rotated until the leading end of sheet 73 is gripped in the nip of the rollers. The roller pair 64 which is bodily displaceable as shown by arrow 76 in dashed line is next swung upwardly, see FIG. 4b, whereby the leading end of the sheet becomes located inside the drum. Fingers 63 do not interfere with the roller movement since the smaller sections of the rollers provide space for the fingers, see FIG. 1c.

Figure 2C:
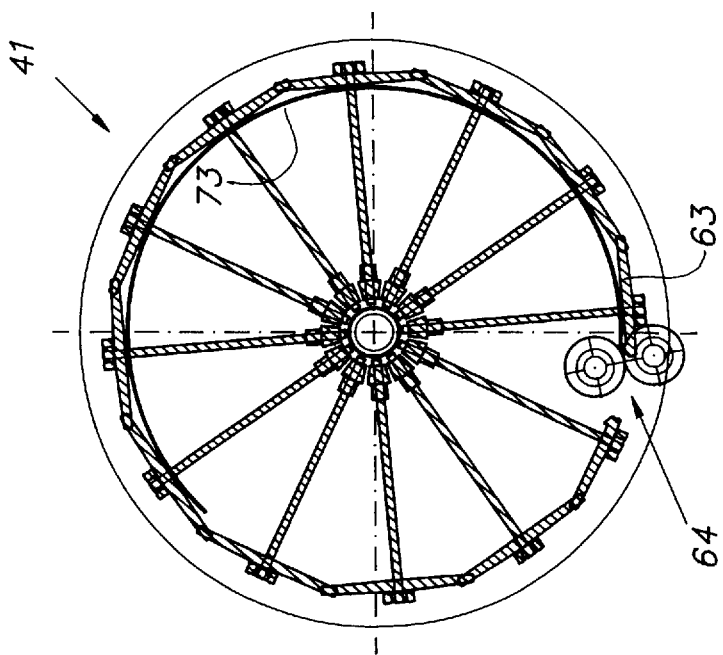
Figure 2F:
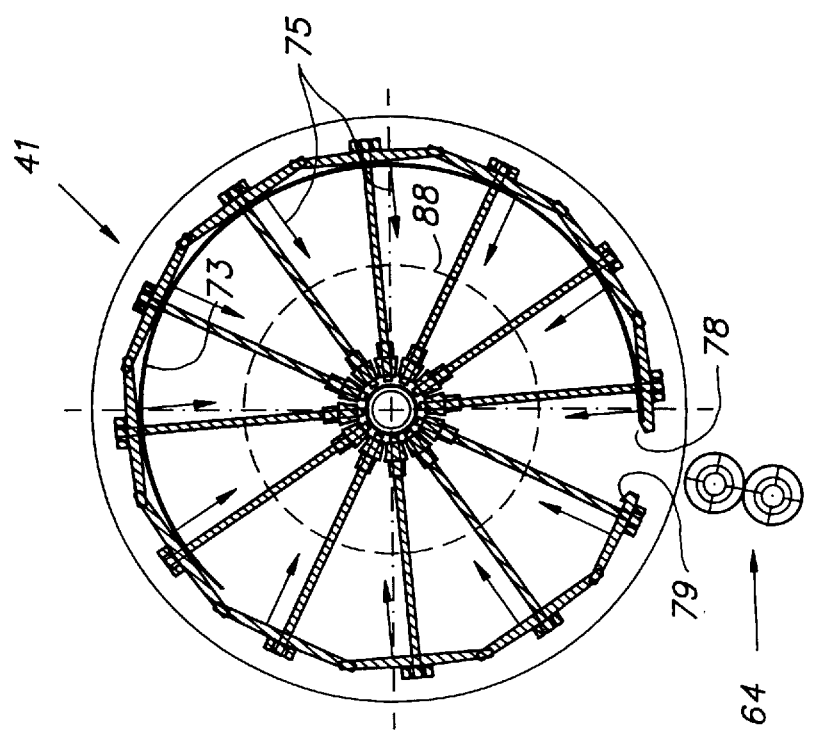

Next, rollerpair 64 is driven to introduce the sheet almost completely in the drum, see FIG. 2c. Then drum 41 is slightly angularly rotated in backward direction, see FIG. 2d, whereby the trailing end of the sheet passes beyond stop 78 formed by a hook-like extension on each of fingers 63 at one end of the drum opening.

Figure 2E:
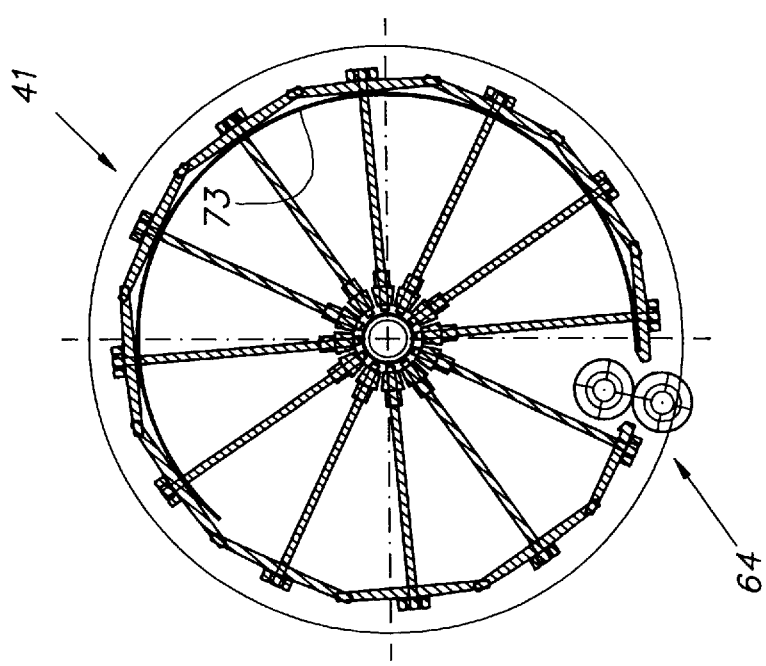

Next drum 41 is rotated forward into its start position, see FIG. 2e, so that rollerpair 64 can be withdrawn into its original position outside the drum. The diameter adjustment mechanism is now actuated, see the arrows 75 in FIG. 2f, whereby the drum diameter is reduced until the leading and trailing sheet edges become clamped between end stops 78, 79, being located at that moment on a diameter 88 drawn in broken lines. It will be understood that the focusing means of the exposure head has to be adjusted in accordance with the distance to the radiation sensitive sheet. Therefore it is interesting to use auto-focusing means controlled by any suitable feed back system which is responsive to the actual distance between the sheet and the exposure source.

Figure 3:
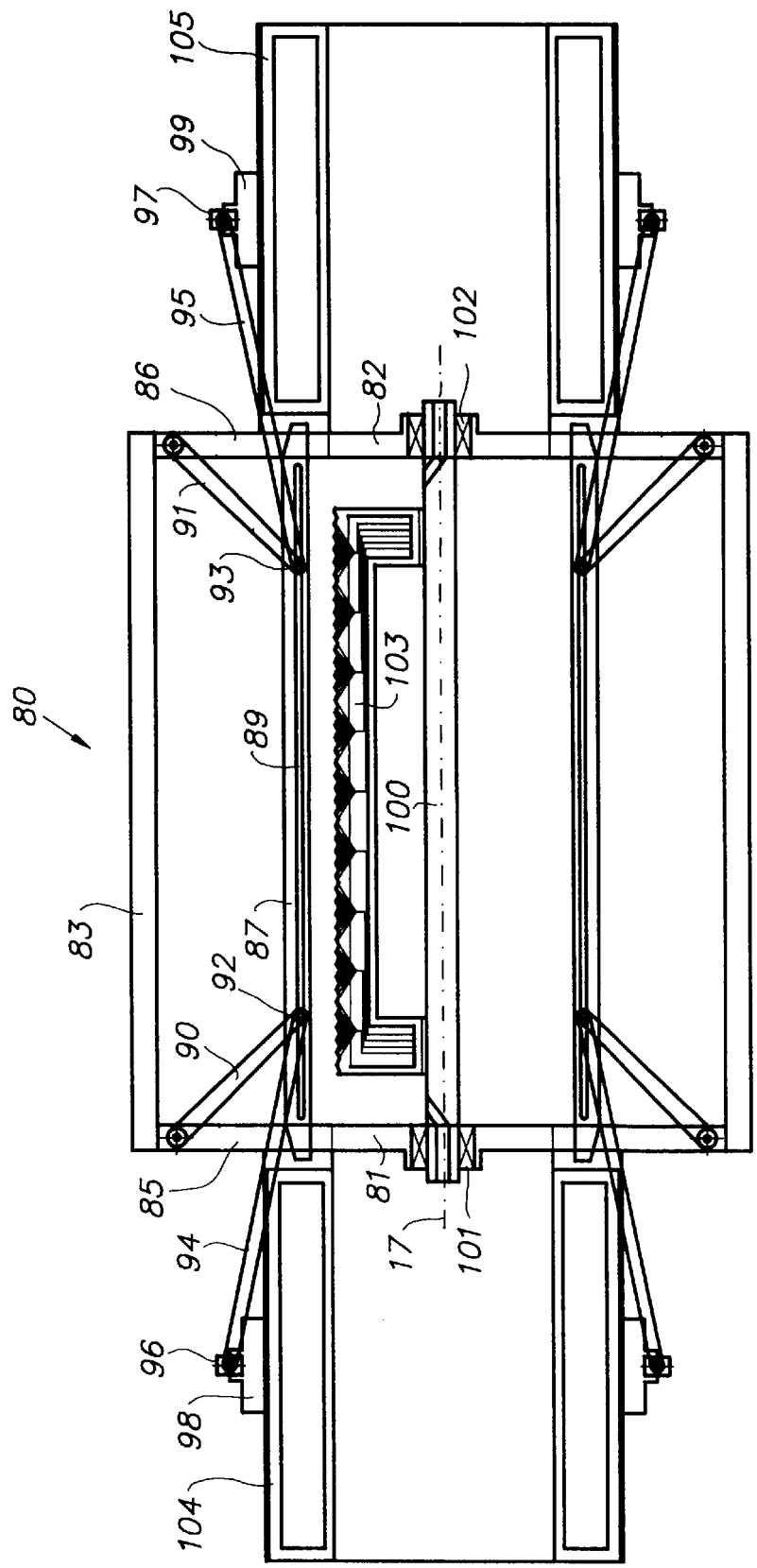
FIG. 3 shows an other embodiment of an adjustable imagesetter according to the invention for internal-drum exposure, provided with an elongate exposure head for the image-wise exposure.

FIG. 3 illustrates another embodiment of a drum imagesetter with adjustable diameter.

Drum 80 is in fact a cage formed by two axially spaced disc-like flanges 81, 82 interconnected by ribs 83. The flanges are rotatably journalled on the stationary shaft 100 of the drum by means of roller bearings 101, 102.

Both flanges have radial grooves 85, 86 guiding the ends of radially displaceable bars 87 having over nearly their complete length a slot 89. Arms 90 and 91 pivotally connected at one end at respective flanges 81 and 82, have their other end slideably connected to groove 89 of bars 87 by means of pins 92, 93. The axial position of the pins is controlled by arms 94, 95 pivotally connected to rings 96, 97 rotatable in a corresponding groove of adjustment sleeves 98, 99 threadably engaging hubs 104, 105 that make part of the corresponding flanges of the drum.

Adjustment of the radial position of bars 87, and thus of the inside diameter of the drum, is obtained by changing the axial position of rings 96, 97 by appropriate rotation of sleeves 98, 99 with respect to the hubs. The arms 94, 95 correspondingly alter the axial position of pins 92, 93 and in consequence the radial position of said pins, and thus of bars 87, is changed.

The exposure of a sheet inside the rotating virtual drum occurs in the present example by means of a multi-element exposure head 103. This head comprises a multiplicity of LED's with associated driving circuits and appropriate focussing means, e.g. in the form of a Selfoc (Tradename), for focusing the image of the LED's on the innerside surface of the light-sensitive sheet. A suitable embodiment of a LED head with staggered rows of LED's on abutting arrays is disclosed in U.S. Pat. No. 4,536,778 of the present assignee.

Figure 4:
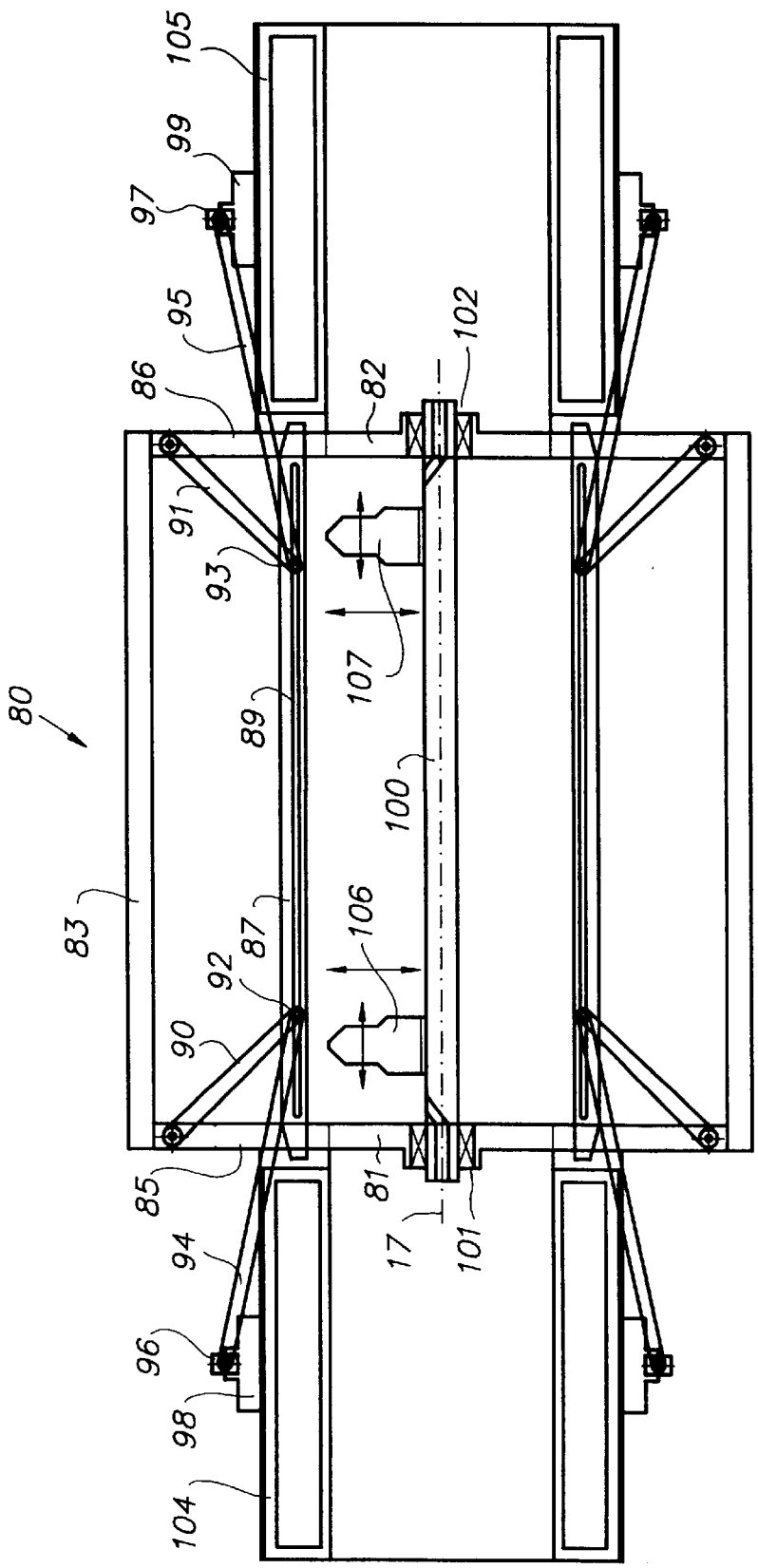
FIG. 4 shows the imagesetter according to FIG. 3, but provided with two separate exposure heads for carrying out the exposure.

FIG. 4 shows a virtual drum imagesetter with variable diameter according to FIG. 3 wherein, however, two exposure heads 106, 107 that each either comprise a single radiation source, or an elongate array of a plurality of sources are provided.

Both exposure heads can either mechanically or electronically be coupled to work together, thereby to cover each half the exposure width of the apparatus. It is clear that three or more exposure heads can be provided working together to constitute a multi-channel writing system.

We claim:

1. Drum-type imagesetter for producing an image on a flexible sheet of radiation-sensitive material, which comprises retaining means (62, 63, 87) forming a drum for retaining said sheet in a substantially cylindrical configuration, and exposure means (70, 103, 106, 107) for image-wise exposing said sheet, said sheet retaining means comprising adjustment means for allowing different drum diameters to be set for obtaining a duty cycle of at least 90% for different sheet formats.

2. Drum-type imagesetter according to claim 1, wherein said sheet retaining means (62, 63, 87) are arranged for entering in supporting contact with local areas only of the sheet, thus forming a virtual drum.

3. Drum-type imagesetter according to claim 1, wherein said exposure means comprises an auto-focusing system.

4. Drum-type imagesetter according to claim 1, wherein said exposure means (70, 103, 106, 107) is arranged for internal exposure of a sheet.

5. Drum-type imagesetter according to claim 1, wherein said exposure means is arranged for external exposure of a sheet.

6. Drum-type imagesetter according to claim 1, wherein said exposure means comprises a linear multi-element radiation array (103) aligned with the axis (17) of the drum and covering the complete exposure width (i.e. the sheet dimension parallel to the axis of the drum) of the imagesetter.

7. Drum-type imagesetter according to claim 2, wherein said exposure means comprises at least one linear multi-element radiation array (70) aligned with the axis of the virtual drum and covering part only of the exposure width, and means for moving said array parallel to the axis of the drum thereby to cover the complete exposure width of the imagesetter as the drum rotates.

8. Drum-type imagesetter according to claim 1, wherein said exposure means comprises a single-element radiation source, and means for moving said radiation source parallel to the axis of the drum thereby to cover the complete exposure width of the imagesetter.

9. Drum-type imagesetter according to claim 1, wherein said exposure means comprises at least two writing heads mutually spaced according to the axis of the drum, and means for moving said sources simultaneously and parallel to the drum axis whereby they perform as a multi-channel writing system.

10. Drum-type imagesetter according to claim 1, wherein said exposure means comprises a laser.

11. Drum-type imagesetter according to claim 1, wherein said exposure means comprises LED's.

12. Drum-type imagesetter according to claim 1, which is arranged for optical exposure.

13. Drum-type imagesetter according to claim 1, which is arranged for heat-mode exposure.

14. Drum-type imagesetter according to claim 1, wherein said sheet retaining means comprises a plurality of angularly equispaced bars (62, 87) running parallel to the drum axis.

15. Drum-type imagesetter according to claim 14, wherein said adjustment means comprises radial screw-threaded shafts (49, 50) which are in screw-threaded engagement with said bars (62), and means (58, 59, 60) for rotating said shafts.

16. Drum-type imagesetter according to claim 15, wherein said bars (87) have longitudinal slots (89), said slots are engaged by pins (92, 93) fitted to pivotable arms (90, 91), and means is provided for controlling the angular position of such arms.

17. Drum-type imagesetter according to claim 16, wherein said control means comprises control arms (94, 95) connected at one end to the axially moveable ends of said arms pivotable (90, 91) and at the other end to a ring (96, 97) the position of which is adjustable according to the axis of the drum.

18. Drum-type imagesetter according to claim 17, wherein the position of said ring is controlled by means of a sleeve (98, 99) which is in threaded engagement with a hub (104, 105) making part of the drum.

19. Method of producing an image on a flexible sheet of radiation sensitive material by means of a drum-type imagesetter according to claim 1, comprising the steps of setting the diameter of said imagesetter to a large value for loading a light-sensitive sheet, and next setting said diameter to a small value for carrying out the image-wise exposure of the sheet.

20. Method according to claim 19, wherein the setting of said diameter to a smaller value is such that the radiation sensitive sheet covers at least 325 angular degrees (approx. 90%) of the drum.

21. A drum-type imagesetter for producing an image on a flexible sheet of radiation-sensitive material, which comprises retaining means forming a drum for retaining said sheet in a substantially cylindrical configuration, said retaining means comprising a plurality of angularly equispaced bars running parallel to the axis of the drum;

exposure means for image-wise exposing said sheet; and adjustment means for allowing different drum diameters to be set for obtaining an optimum duty cycle for different sheet formats, said adjustment means comprising radial screw-threaded shafts which are in screw-threaded engagement with said bars and means for rotating said shafts.

22. The drum-type imagesetter of claim 21, further comprising pivotable arms and control means for controlling the angular position of said pivotable arms, and wherein said bars have longitudinal slots that are engaged by pins fitted to said pivotable arms.

23. The drum-type imagesetter of claim 22, wherein said control means comprises control arms connected at one end to the axially moveable ends of said pivotable arms and at the other end to a ring, the position of the ring being adjustable according to the axis of the drum.

24. The drum-type imagesetter of claim 23, where the position of the ring is controlled by means of a sleeve that is in threaded engagement with a hub, making part of the drum.

* * * * *